US011100696B2

(12) United States Patent
Dupuis et al.

(10) Patent No.: US 11,100,696 B2
(45) Date of Patent: Aug. 24, 2021

(54) SYSTEMS, METHODS, AND MEDIA FOR RENDERING VOXEL-BASED 3D CONTENT

(71) Applicant: Case Western Reserve University, Cleveland, OH (US)

(72) Inventors: Andrew Dupuis, Cleveland, OH (US); Mark A. Griswold, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 16/860,014

(22) Filed: Apr. 27, 2020

(65) Prior Publication Data

US 2020/0342653 A1    Oct. 29, 2020

Related U.S. Application Data

(60) Provisional application No. 62/838,757, filed on Apr. 25, 2019.

(51) Int. Cl.
*G06T 15/00* (2011.01)
*G06T 15/08* (2011.01)
*G06T 15/06* (2011.01)

(52) U.S. Cl.
CPC ............ *G06T 15/005* (2013.01); *G06T 15/06* (2013.01); *G06T 15/08* (2013.01)

(58) Field of Classification Search
None
See application file for complete search history.

(56) References Cited

U.S. PATENT DOCUMENTS

| | | | | |
|---|---|---|---|---|
| 9,754,405 | B1* | 9/2017 | Young | G06T 17/005 |
| 2008/0252641 | A1* | 10/2008 | Masumoto | A61B 6/08 |
| | | | | 345/424 |
| 2011/0228055 | A1* | 9/2011 | Sharp | G06T 15/06 |
| | | | | 348/51 |
| 2012/0206335 | A1* | 8/2012 | Osterhout | G06F 3/017 |
| | | | | 345/156 |
| 2018/0302614 | A1* | 10/2018 | Toksvig | G06T 19/00 |

* cited by examiner

*Primary Examiner* — Robert J Craddock
(74) *Attorney, Agent, or Firm* — Quarles & Brady LLP

(57) ABSTRACT

Systems, methods, and media for rendering voxel-based 3D content are provided. In some embodiments, a system for rendering voxel-based content comprises: a display; and hardware processor programmed to: receive voxel-based data representing an object at multiple different resolutions; perform, for a representation including low-resolution voxels, a first forward-projection ray marching operation with a step size based on the voxel volume; identify a voxel that causes a threshold to be exceeded; perform, for a second representation including higher-resolution voxels each smaller in volume than the first voxels, a second forward-projection ray marching operation; identify a second voxel in the second representation that causes the threshold to be exceeded; determine that the second representation is a highest resolution available; and cause a pixel to present a portion of the object based on a value associated with the second voxel.

21 Claims, 7 Drawing Sheets

US 11,100,696 B2

SYSTEMS, METHODS, AND MEDIA FOR RENDERING VOXEL-BASED 3D CONTENT

CROSS-REFERENCE TO RELATED APPLICATIONS

This application is based on, claims the benefit of, and claims priority to, U.S. Provisional Patent Application No. 62/838,757, filed Apr. 25, 2019, which is hereby incorporated herein by reference in its entirety for all purposes.

STATEMENT REGARDING FEDERALLY SPONSORED RESEARCH

N/A

BACKGROUND

Conventional rendering techniques for voxel-based volumetric data are computationally intensive, and accordingly often require expensive processing devices (e.g., a high end graphics processing unit (GPU)) to render the data without significant lag or errors. Additionally, these techniques generally lack the performance flexibility and extensibility of polygon-based surface rendering techniques used in most 3D rendering solutions. However, voxel-based rendering can provide many benefits over surface rendering when a visualization's source data is itself in a voxelized format, as is often the case for medical imaging data, such as magnetic resonance imaging (MRI) and computed tomography (CT) data. Performance limitations of conventional voxel-based rendering techniques require high performance computing equipment, making voxel based rendering infeasible for use with low end computing devices and/or mobile computing devices, and/or in display environments such as virtual reality (VR) and augmented reality (AR) that present content at relatively high resolution.

Accordingly, new systems, methods, and media for rendering voxel-based 3D content are desirable.

SUMMARY

In accordance with some embodiments of the disclosed subject matter, systems, methods, and media for rendering voxel-based 3D content are provided.

In accordance with some embodiments of the disclosed subject matter, a system for rendering voxel-based content is provided, the system comprising: at least one display comprising a plurality of pixels; and at least one hardware processor that is programmed to: receive voxel-based data representing one or more objects depicted in the voxel-based content, the voxel-based data including representations of the one or more objects at multiple different resolutions; perform, for a first pixel of the plurality of pixels and a first representation of the voxel-based content that includes a first plurality of voxels that each represent a first volume, a first forward-projection ray marching operation with a first step size based on the first volume of the first plurality of voxels; identify, based on the first forward projection ray marching operation, a first voxel included in the first representation that causes a criterion to be satisfied; perform, for the first pixel of the plurality of pixels and a second representation of the voxel-based content that includes a second plurality of voxels that each represent a second volume that is smaller than the first volume, a second forward-projection ray marching operation, wherein the second plurality of voxels each represents a portion of the voxel-based data that is also represented by the first voxel; identify, based on the second forward projection ray marching operation, a second voxel included in the second representation that causes the criterion to be satisfied; determine that the second representation is a highest resolution representation available; and cause the first pixel to present a portion of the one or more objects based on a value associated with the second voxel.

In some embodiments, the system comprises a head mounted display (HMD) incorporating the at least one display and the at least one hardware processor.

In some embodiments, the system comprises a mobile computing device incorporating the at least one display and the at least one hardware processor.

In some embodiments, a highest resolution representation of the voxel-based content included in the voxel-based data has a shortest dimension of at least 256 voxels.

In some embodiments, the number of voxels represented by a highest resolution representation of the voxel-based content included in the voxel-based data is at least 500 times the number of voxels represented by the first representation of the voxel data.

In some embodiments, the second representation of the voxel-based content is the highest resolution representation received voxel-based data.

In some embodiments, the processor is further programmed to: perform, for the first pixel of the plurality of pixels and a third representation of the voxel-based content that includes a third plurality of voxels that each represent a third volume that is smaller than the first volume and larger than the second volume, a third forward-projection ray marching operation with a third step size based on the third volume of the third plurality of voxels, wherein the third plurality of voxels each represents a portion of the voxel-based data that is also represented by the first voxel and the second plurality of voxels each represents a portion of the voxel-based data that is also represented by the third voxel; identify, based on the third forward projection ray marching operation, a third voxel included in the third representation that causes the criterion to be satisfied; and begin the second forward-projection ray marching operation at a voxel of the third plurality of voxels that corresponds to a portion of the first voxel at which the first forward-projection ray marching operation intersected the first voxel.

In accordance with some embodiments of the disclosed subject matter, a method for rendering voxel-based content is provided, the method comprising: receiving voxel-based data representing one or more objects depicted in the voxel-based content, the voxel-based data including representations of the one or more objects at multiple different resolutions; performing, for a first pixel of a plurality of pixels and a first representation of the voxel-based content that includes a first plurality of voxels that each represent a first volume, a first forward-projection ray marching operation with a first step size based on the first volume of the first plurality of voxels; identifying, based on the first forward projection ray marching operation, a first voxel included in the first representation that causes a criterion to be satisfied; performing, for the first pixel of the plurality of pixels and a second representation of the voxel-based content that includes a second plurality of voxels that each represent a second volume that is smaller than the first volume, a second forward-projection ray marching operation, wherein the second plurality of voxels each represents a portion of the voxel-based data that is also represented by the first voxel; identifying, based on the second forward projection ray marching operation, a second voxel included in the second representation that causes the criterion to be satisfied; determining that the second representation is a highest resolution representation available; and causing the first pixel to present a portion of the one or more objects based on a value associated with the second voxel.

In accordance with some embodiments of the disclosed subject matter, a non-transitory computer readable medium containing computer executable instructions that, when executed by a processor, cause the processor to perform a method for rendering voxel-based content is provided, the method comprising: receiving voxel-based data representing one or more objects depicted in the voxel-based content, the voxel-based data including representations of the one or more objects at multiple different resolutions; performing, for a first pixel of a plurality of pixels and a first representation of the voxel-based content that includes a first plurality of voxels that each represent a first volume, a first forward-projection ray marching operation with a first step size based on the first volume of the first plurality of voxels; identifying, based on the first forward projection ray marching operation, a first voxel included in the first representation that causes a criterion to be satisfied; performing, for the first pixel of the plurality of pixels and a second representation of the voxel-based content that includes a second plurality of voxels that each represent a second volume that is smaller than the first volume, a second forward-projection ray marching operation, wherein the second plurality of voxels each represents a portion of the voxel-based data that is also represented by the first voxel; identifying, based on the second forward projection ray marching operation, a second voxel included in the second representation that causes the criterion to be satisfied; determining that the second representation is a highest resolution representation available; and causing the first pixel to present a portion of the one or more objects based on a value associated with the second voxel.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
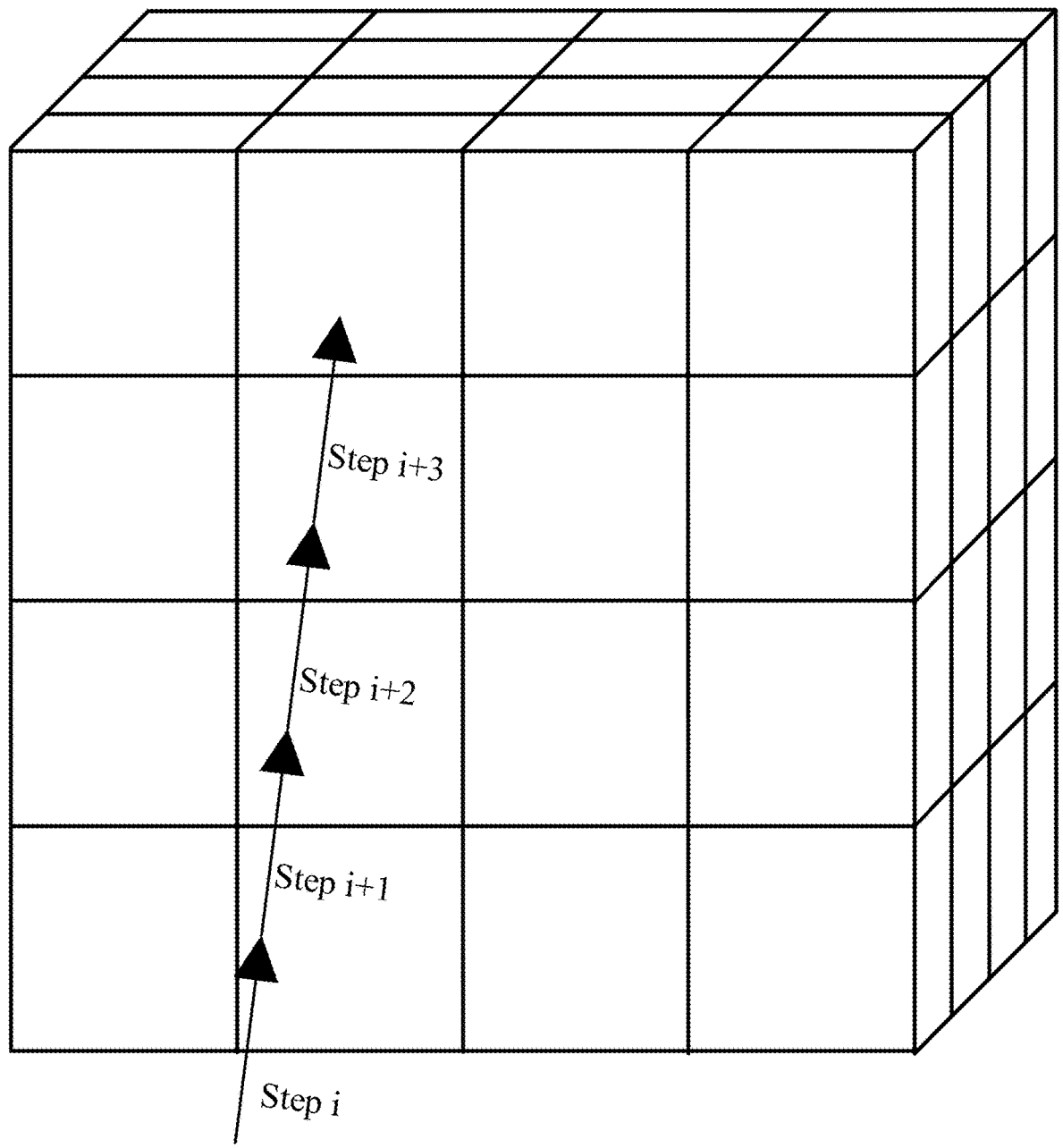
FIG. 1 shows an example of a portion of a conventional forward-projection ray marching technique.

Before any embodiments of the disclosed subject matter are explained in detail, it is to be understood that the disclosed subject matter is not limited in its application to the details of construction and the arrangement of components set forth in the following description or illustrated in the following drawings. The disclosed subject matter is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosed subject matter. Various modifications to the illustrated embodiments will be readily apparent to those skilled in the art, and the generic principles herein can be applied to other embodiments and applications without departing from embodiments of the disclosed subject matter. Thus, embodiments of the disclosed subject matter are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosed subject matter. Skilled artisans will recognize the examples provided herein have many useful alternatives and fall within the scope of embodiments of the disclosed subject matter.

In accordance with some embodiments of the disclosed subject matter, mechanisms (e.g., which can include systems, methods, and media) for rendering voxel-based 3D content are provided. In some embodiments, the mechanisms described herein can generate, from voxel-based content of a relatively high resolution (e.g., CT image data, MRI image data) lower resolution versions of the voxel-based content, which can be used to accelerate rendering of the voxel-based content. For example, two dimensional slices of data or a pre-constructed three dimensional scene can be processed to generate a 3D Texture for use on a commodity GPU. In such an example, the mechanisms described herein can generate lower-resolution samples of the image (sometimes referred to herein as "mips"), which can be created and stored within a 3D Texture (e.g., as a mipmap) to create a source file that can be used during rendering of the image and/or a lower resolution version of the image. In a more particular example, a lower resolution version of CT imaging data can be generated and stored within a 3D texture to create a source file that can be used during rendering of the image and/or a lower resolution version of the image. As another more particular example, a lower resolution version of a MRI imaging data can be generated and stored within a 3D texture to create a source file that can be used during rendering of the image and/or a lower resolution version of the image. Note that in such examples, the lower resolution version of the data can be generated in real-time as part of a process of generating a relatively high resolution version of the image data. Accordingly, in some embodiments, mechanisms described herein can be used to render voxel-based 3D content in real time as the image data is being generated. In general, a mipmap can be a hardware supported pyramid of representations (e.g., mips) of content at various resolutions (e.g., a highest resolution representation can form the "base" of the pyramid as it includes the most information, and a lowest resolution representation can form the apex of the pyramid as it includes the least information) configured to be stored in contiguous memory.

Note that although mechanisms are generally described herein in connection with mips, this is merely an example, and mechanisms described herein can be used with other variable resolution representations of the content, such as an octree.

In some embodiments, representations of content can be stored using actual values at each level (e.g., a value of each voxel in the highest resolution representation can be stored in the highest resolution level of the mipmap in memory, a value of each voxel in the second-highest resolution representation can be stored in the second-highest resolution level of the mipmap in memory, etc.). In such embodiments, if the content being rendered is dynamic content (e.g., an image based on MR data that is being generated, a dynamic model, etc.), mechanisms described herein can update the values in memory over time as the content changes. Alternatively, in some embodiments, an updated mipmap can be generated that stores delta values between a previous mipmap and a current mipmap for each progressive mipmap level.

In some embodiments, a source file generated using the mechanisms described herein can be located on a local computing device (e.g., a head mounted display, a tablet computer, a smartphone, a laptop computer, etc.) and/or the source file can be streamed to the computing device over a network (e.g., from a server computing device). In some embodiments, progressively higher-resolution mips can be provided to the computing device as the computing device is prepared to receive the higher-resolution mips. For example, using techniques described herein, 3D content can be streamed to a local computing device in real-time at different resolutions that can account for both computational capabilities of the local computing device and the capacity of the network being used by the local computing device and/or server computing device to convey the content.

In some embodiments, mechanisms described herein can be used by the local computing device to reconstitute the source 3D texture, with the highest-quality mip available at the start of a particular rendering frame being marked to indicate when a rendering process can be terminated. In some embodiments, forward-projection raymarching techniques can be used to render a highest quality version of the content that is available at the time that a particular frame is being rendered. For example, rays can be cast within a representative shape assigned to the content being rendered. These rays can be projected along the forward view ray of the scene camera, and each ray can iteratively progress through the representative shape in steps dictated by the voxel resolution of the lowest resolution mip available. As the ray marches forward, the computing device rendering the content can determine the data value contained at the most recent marching position, and can compare the data value to a threshold value. In some embodiments, the threshold value can be set by a user and/or can be set via material classifications determined a priori. In some embodiments, the threshold can be determined based on any suitable criteria or combination of criterion based on a rendering objective. For example, for a head CT or MRI, a user may wish to skip rendering data that is outside of the head, and thus the threshold can be set a relatively low value. In a more particular example, the value can be based on a preset threshold (e.g., based on an average value of noise in "empty" space in a CT or MRI, based on a value for air, etc.). In another more particular example, the value can be based on a signal-to-noise ratio of the dataset being rendered, can be a variable that is set based on a transfer function, etc. As another example, for a head CT or MRI, a user may wish to visualize a brain of a subject, and can set a threshold to exclude bone from being rendered.

Note that in some embodiments, the source of the content can be in any suitable format, however, mipmaps can be generated from a version of the content that has a relatively uniform spatial distribution (e.g., a version of the content that is formatted on a regularized grid). For example, certain image data such as CT image data can be natively arranged on a 3D grid with indices (e.g., i, j, k) in a 3D matrix that produce a relatively uniform distribution at the rendering resolution. However, in other formats, such as a point cloud, each point can be associated with a location (e.g., recorded using x, y, and z coordinates) within a bounding box, and the locations can be converted to voxel (or pixel) indices. However, depending on the resolution of the point cloud data and the resolution of the grid onto which the point cloud data is being projected, multiple points can occur at the same index. In some embodiments, a highest resolution representation can have a resolution that facilitates no greater than a 1:1 correspondence between points in the point cloud data, and points in the representation. In some embodiments, the content of a point at a particular (x,y,z) location of the point cloud can be stored in the color channels at a corresponding index (i,j,k). Additionally or alternatively, in some embodiments the point cloud (or other irregularly spatially distributed data) can be sampled and/or data points can be combined to generate a more regularized representation that can be represented by a grid with a lower resolution than the original point cloud data. Such a lower-resolution representation can provide less information than the original point cloud in some cases, but can also be used to generate a mipmap that requires less memory.

In some embodiments, when a computing device rendering the content determines that a voxel in the lowest resolution mip has been reached that exceeds the threshold value, the computing device can perform a recursive lookup to identify the corresponding "daughter" voxels that correspond to the voxel that exceeded the threshold in a higher resolution mips. For example, eight voxel positions in a higher resolution representation can correspond to a single voxel at the lowest resolution representation, and eight voxels in a yet higher resolution representation can correspond to a single voxel at the second lowest resolution representation, and so on. Accordingly in the third lowest resolution representation 64 voxel positions can be used to represent a single voxel position in the lowest resolution representation of the content. In some embodiments, each daughter voxel that is in the path of the ray can be compared to the threshold value, with those exceeding threshold again triggering a lookup in their "daughters." For example, if the ray intersects a particular voxel in a lower resolution representation of the content that exceeds the threshold, mechanisms described herein can determine which daughter voxels the ray passes through. In such an example, mechanisms described herein can determine an order in which the daughter voxels are traversed by the ray, and any daughter voxels that are not passed through can be ignored. In such an example, mechanisms described herein can check the daughter voxels that are passed through sequentially (e.g., based on the order in which the ray passes through) to determine if the threshold is exceeded. In some embodiments, the order in which the daughter voxels are passed through can be recorded, which can be used later to, for example, perform imaging effects such as determining reflections, scattering, or subsurface effects for a surface that was rendered using the original ray-marching operation.

As another example, if the ray intersects a particular voxel in a lower resolution representation of the content that exceeds the threshold, and the lower resolution represents a next highest resolution at a ratio of 8:1 (e.g., with each voxel representing eight daughter voxels), the value of all eight daughter voxels can be compared to the threshold to determine whether each daughter pixel exceeds the threshold. In such an example, daughter voxels that do not exceed the threshold can be ignored, while daughter voxels that do exceed the threshold can be considered during further processing. In such an example, a ray marching operation can be restarted using a border of the lower-resolution voxel as a reference point, and as the ray intersects each daughter voxel the computing device rendering the content can determine whether that daughter voxel exceeds the threshold based on the outcome of the earlier comparison. As yet another example, if the ray intersects a particular voxel in a lower resolution representation of the content that exceeds the threshold, a ray marching operation can be restarted using a border of the lower-resolution voxel as a reference point, and the computing device can determine whether each daughter voxel that is encountered exceeds the threshold when the daughter voxel is encountered. In some such embodiments, the location and intensity of the first voxel in a highest resolution projection to exceed the threshold value can found.

In some embodiments, mechanisms described herein can be used to accelerate the process for projecting a 3D texture into space and/or reduce the computational resources required to project the 3D texture into space. For example, the mechanisms described herein can facilitate real-time rendering of voxel-based content by devices such as mobile phones, AR headsets (e.g., such as the Hololens), and/or other computing devices with relatively limited computational resources.

Additionally, in some embodiments, the mechanisms described herein can be used to implement a "tiered" loading/rendering scheme for rendering 3D voxel data. In some embodiments, by allowing for constructive loading of datasets, the mechanisms described herein can facilitate adaptive real-time rendering of remotely streamed high resolution datasets with relatively minimal computational load for a client device (e.g., a smartphone, a tablet computer, a wearable computer, a laptop computer, etc.). This can offer utility in not only medical imaging scenarios, but also in generalized 3D media streaming for VR and AR content.

FIG. 1 shows an example of a portion of a conventional forward-projection ray marching technique. Conventional front-projection raymarching techniques can involve marching a ray through a volume with steps equal to the Pythagorean length of the volume's dataset (in voxels). For example, a volume can be defined by 512 voxels in each direction (i.e., having a depth d, width w, and height h of 512 voxels), with each voxel representing a volume $v^3$, where v is the length of the voxel in each direction. Note that this is merely an example, and voxels can have unequal dimensions. In a particular example, MRI image data can include voxels that have lateral dimensions that are smaller than the axial direction. Continuing the preceding example, the Pythagorean length P of the 512×512×512 volume is about 886 (i.e., $P^2=d^2+w^2+h^2$). In such an example, rendering a particular pixel may require marching through 886*2 steps (e.g., based on the Nyquist theorem) to ensure that a voxel that exceeds the threshold is not omitted. Each of these potential marching steps can require a texture lookup and multiple lines of math operations to determine whether to stop the ray marching operation for each pixel. This can lead to high computational costs in order to render each pixel of the object represented.

Figure 2:
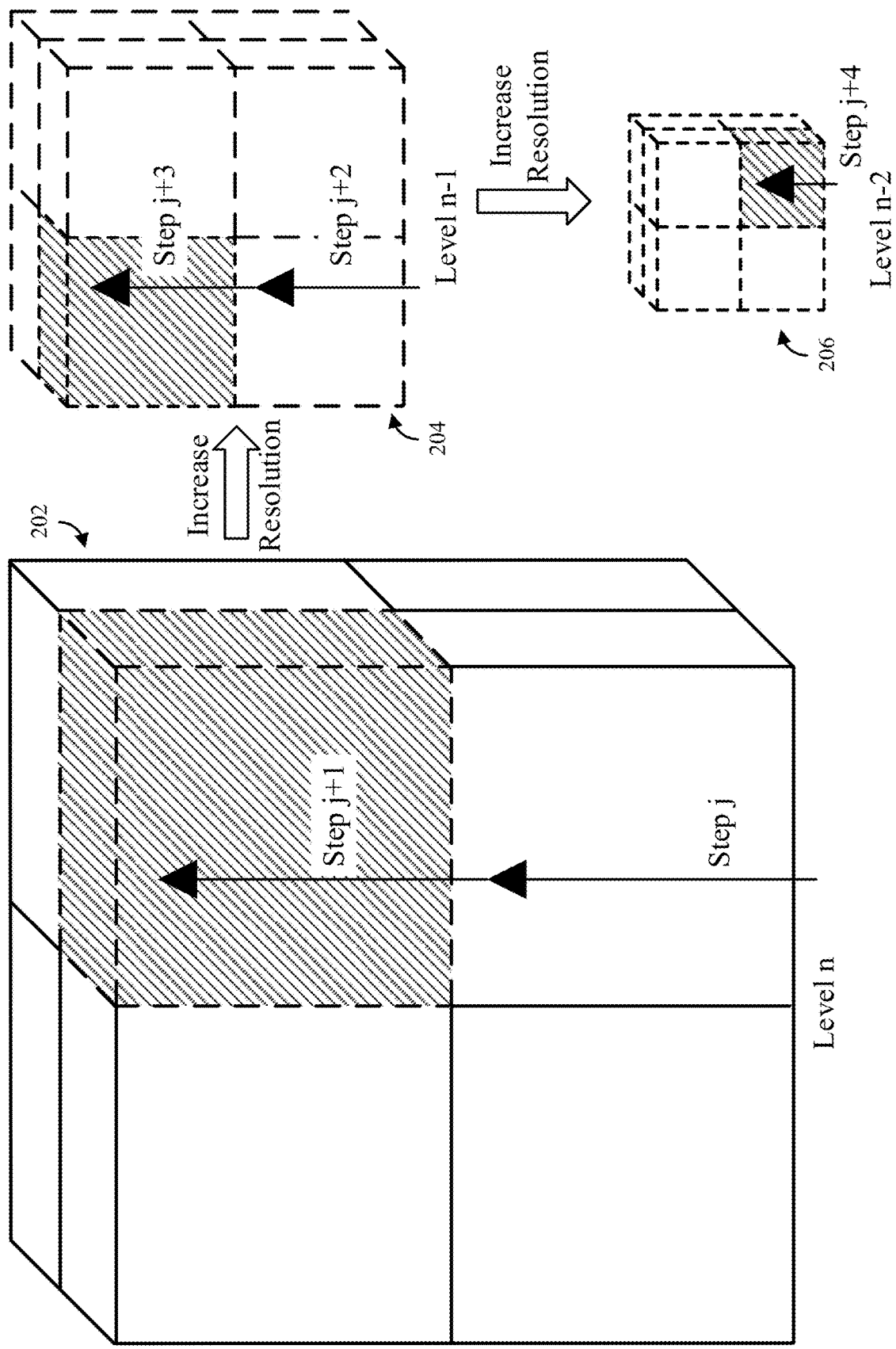
FIG. 2 shows an example of a portion of a forward-projection ray marching technique implemented in accordance with some embodiments of the discloses subject matter.

FIG. 2 shows an example of a portion of a forward-projection ray marching technique implemented in accordance with some embodiments of the discloses subject matter. In some embodiments, the mechanisms described herein can be used to reduce the number of marching steps and computations that are required to render a particular pixel. For example, a portion of a voxel-based dataset can be represented using a first representation 202 having a relatively low resolution, while a smaller portion of the voxel-based dataset can be represented using a second representation 204 where the eight voxels depicted as part of second representation 204 correspond to a single voxel in first representation 202. A still smaller portion of the voxel-based dataset can be represented using a third representation 206 where the eight voxels depicted as part of third representation 206 correspond to a single voxel in second representation 204.

In a more particular example, a dataset having a highest resolution (e.g., a native resolution) of $512^3$ voxels can be used to generate progressive mips of resolution 256, 128, 64, 32, 16, and so on. Assuming for this example that first representation 202 is a size-16 mip, the entire dataset can be traversed using at most 27 raymarching steps to traverse the volume (e.g., where the raymarching steps are each of a length roughly equal to the shortest dimension represented by each voxel). Upon reaching a threshold (shown as a voxel shaded with a diagonal line pattern in representation 202 reached at step j+1), the daughter voxels corresponding to the voxel that exceeded the threshold can be accessed from the size-32 mip (e.g., in this case representation 204), and raymarching can recommence from where step j+1 crossed the voxel that exceeded the threshold. Upon reaching a threshold (shown as a voxel shaded with a diagonal line pattern in representation 204 reached at step j+3), the daughter voxels corresponding to the voxel that exceeded the threshold can be accessed from the size-64 mip (e.g., in this case representation 206), and raymarching can recommence from where step j+1 crossed the voxel that exceeded the threshold. This process can proceed until the voxel in the highest resolution representation that first exceeds the threshold is identified, and that voxel can be used to render the pixel corresponding to the ray. In the worst case where every threshold voxel is the last one sampled, the maximum number of total steps/texture lookups using mechanisms described herein can depend on a technique used to traverse daughter voxels. For example, assuming that a $16^3$ voxel representation is fully traversed, using 2*27 initial steps (based on the Nyquist frequency, and 4 daughter voxels are checked per mip level (e.g., based on the order in which they would be traversed), the data would be fully sampled after a maximum of 2*27+5*4=74 comparisons if a full set of representations up to a $512^3$ voxel representation are used, as compared to over 1500 comparisons in a worst case for a conventional forward ray marching operation for a $512^3$, a minimum reduction in comparisons upwards of 90%.

Figure 3:
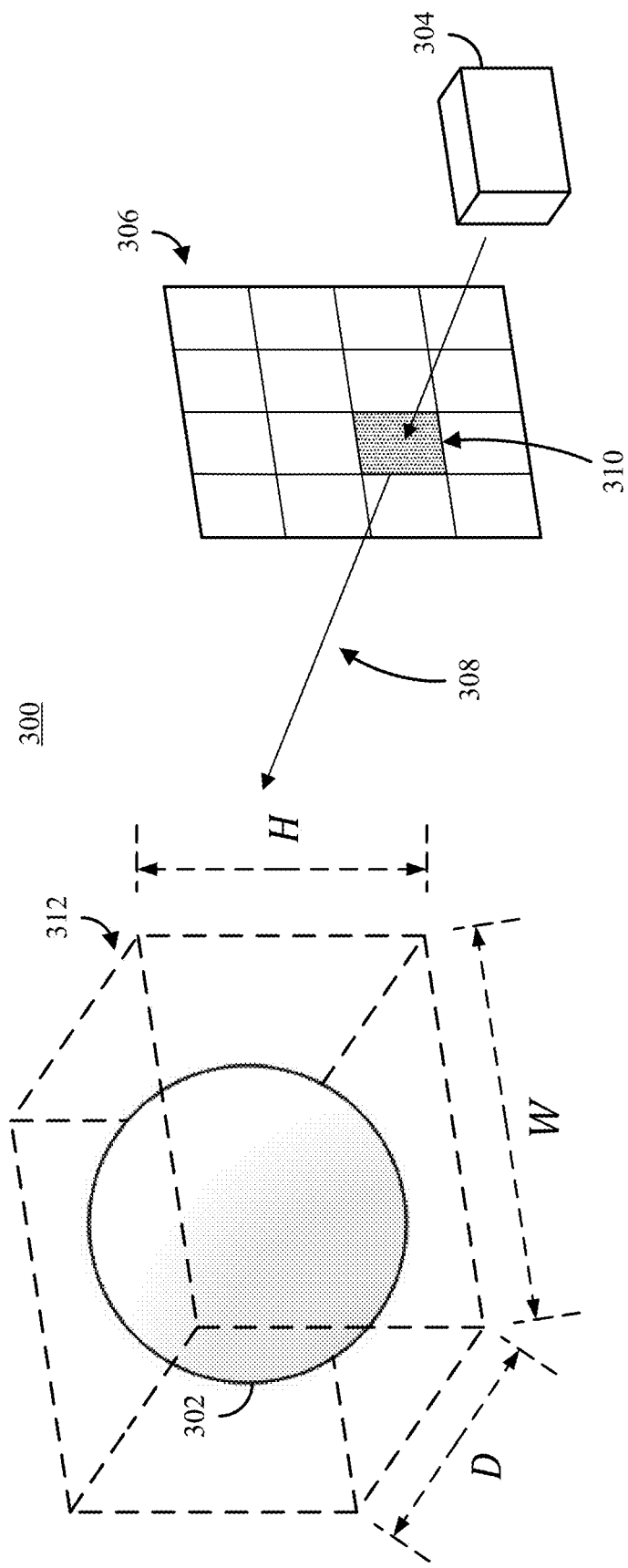
FIG. 3 shows an example representing a portion of a virtual environment presenting a scene that includes a 3D model created from voxel-based imaging data and a virtual camera representing a point of view of a user in accordance with some embodiments of the disclosed subject matter.

FIG. 3 shows an example 300 representing a portion of a virtual environment presenting a scene that includes a 3D model created from voxel-based imaging data and a virtual camera representing a point of view of a user in accordance with some embodiments of the disclosed subject matter. As shown in FIG. 3, the mechanisms described herein can render a 3D model of an object 302 (note that object 302 is presented as a sphere to illustrate concepts associated with the mechanisms described herein without overcomplicating the drawings) within an environment 300, which can be an entirely virtual environment (e.g., a virtual reality environment), or a partially virtual environment (e.g., an augmented reality environment). The 3D model of object 302 can be generated from volumetric medical imaging data of object 302 by organizing many 2D images (e.g., "slices") captured by a medical imaging device (e.g., a CT or MRI device) into a 3D array. Note that the slices that form object 302 can be oriented in any direction with respect to virtual camera 304. In some embodiments, the mechanisms can use a virtual camera 304 representing a viewpoint from which environment 300 is to be presented on a display (e.g., a single display of a stereoscopic pair of displays within a head mounted display). In some embodiments, an array of pixels 306 shown in FIG. 3 represents pixels of a display that is to present environment 300. During operation, the mechanisms described herein can determine, for each pixel in array 306, a brightness value and color values to use when displaying object 302. In some embodiments, the mechanisms described herein can use one or more ray techniques to determine values for each pixel in array 306. For example, the mechanisms described herein can cast a ray 308 (or multiple rays) through a particular pixel 310 and determine whether the ray intersects object 302 (or any other object), and a voxel(s) which the ray intersects that are to be used to render pixel 310.

In some embodiments, the mechanisms described herein can use forward projection raymarching techniques to determine a point (or points) at which a particular ray intersects an object. For example, as described above in connection with FIG. 2, a ray (e.g., ray 308) can be advanced through environment 300 by an incremental distance, and after advancing ray 308 the mechanisms can determine whether the ray intercepted one or more voxels of an object to be rendered based on a relatively low (e.g., a lowest) resolution representation of the object (e.g., a size-16 mip of the object). In some embodiments, the mechanisms described herein can render a bounding box 312 delineating the maximum extent of object 302 (e.g., the depth, height, and width of the object). In some embodiments, when the point at which the ray intersects the object is determined for the low resolution representation of the object, the mechanisms described herein can access higher resolution versions of the object to determine which voxel(s) in particular to use to render the pixel corresponding to the ray. Upon identifying a particular voxel(s), the mechanisms described herein can calculate an intensity value(s) and/or color value(s) for the pixel based on the texture (if any) corresponding to that point, the location and intensity of one or more light sources, the transparency of the voxel (or voxels) which the ray intersects, etc.

Figure 4:
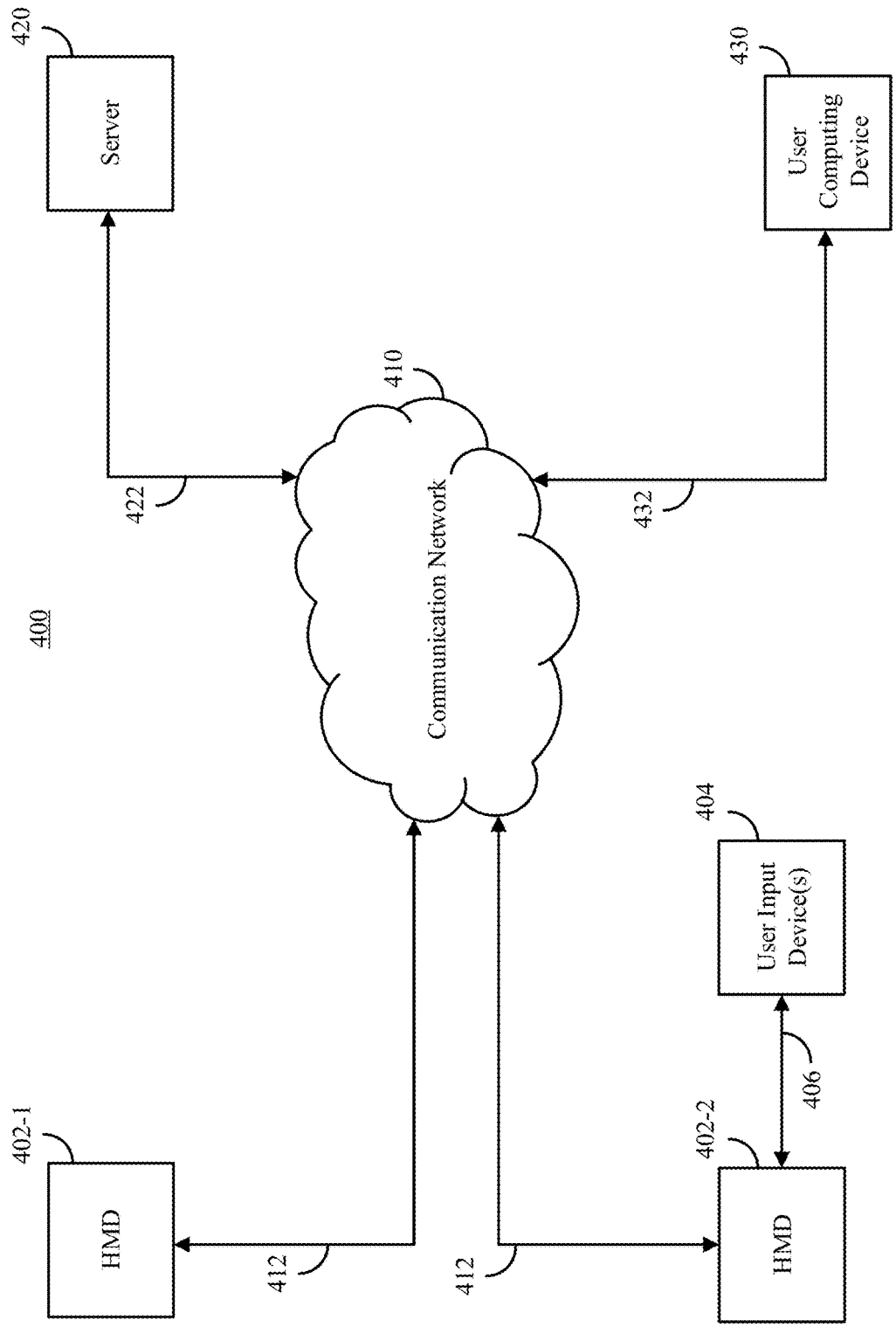
FIG. 4 shows an example of a system including multiple head mounted displays and various computing devices that can be used to render voxel-based 3D content in various environments in accordance with some embodiments of the disclosed subject matter.

FIG. 4 shows an example 400 of a system including multiple head mounted displays and various computing devices that can be used to render voxel-based 3D content in various environments in accordance with some embodiments of the disclosed subject matter. As shown in FIG. 4, system 400 can include multiple head mounted displays (HMDs) 402-1 and 402-2 which can be located in the same physical space (e.g., in the same room), or located in different physical spaces (e.g., in a different room in the same building, in a different building in the same city, in a different city, in a different country, etc.).

In some embodiments, system 400 can include a server 420 that can provide and/or control content that is to be presented by one or more HMDs (e.g., HMDs 402-1 and/or 402-2). In some embodiments, server 420 can be implemented using any suitable computing device such as a server computer, an HMD, a tablet computer, a smartphone, a personal computer, a laptop computer, etc. In some embodiments, each HMD 402 can connect to a communication network 410 via a communications link 412, and server 420 can connect to communication network 410 via a communications link 422. In some embodiments, a user computing device 430 can connect to communication network 410 via a communications link 432. Communication network 410 can be any suitable communication network or combination of communication networks. For example, communication network 410 can be a Wi-Fi network (which can include one or more wireless routers, one or more switches, etc.), a peer-to-peer network (e.g., a Bluetooth network, a Zigbee mesh network, etc.), a cellular network (e.g., a 3G network, a 4G network, etc., complying with any suitable standard, such as CDMA, GSM, LTE, LTE Advanced, WiMAX, etc.), a wired network, etc. Communications links 412, 422, and 432 can each be any suitable communications link or combination of communications links, such as Wi-Fi links, Bluetooth links, cellular links, etc.

In some embodiments, a user can interact with server 420 via user computing device 430 to select content that is to be presented by HMD 402-1 (e.g., a particular scan to be presented), select content that is to be presented by HMD 402-2, and/or select content that is to be displayed by user computing device 430. For example, the user can instruct server 420 to send HMD 402-2 and/or any other suitable HMDs images corresponding to a particular volumetric medical imaging scan (e.g., MRI scan, CT scan, etc.). Additionally or alternatively, in some embodiments, the user can log in to an application executed by HMD 402-2, and/or a service provided via HMD 402-2, using user computing device 430.

In some embodiments, the user can generate a scene (e.g., a scene that is at least partially virtual, such as an augmented reality scene or a virtual reality scene) to be presented by one or more HMDs 402 via user computing device 430 and/or server 420. For example, a user can select imaging data to be used. In some embodiments, the user can upload content and/or identifying information of content to server 420 that is to be presented by HMDs 402 from user computing device 430. For example, the user can upload volumetric medical imaging data. As another example, the user can provide location information (e.g., a URL) at which content to be presented can be accessed. In some embodiments, HMDs 402 can download and/or save the content at any suitable time. For example, the user or an administrator can download, sideload and/or otherwise transfer the content to be viewed to each HMD 402.

In some embodiments, user computing device 430 can be any suitable computing device or combination of devices, such as a personal computer, a laptop computer, a tablet computer, a smartphone, a wearable computer, a head mounted display (e.g., HMD 402), etc. In some embodiments, a user can select content, upload content, etc., using user computing device 430 and/or server 420 using any suitable technique or combination of techniques. For example, user computing device 430 can execute an application from memory that is configured to facilitate selection of volumetric medical imaging data to be presented, assembling the volumetric medical imaging data into a 3D array to be used in generating a 3D model (e.g., an array of voxels), uploading the volumetric medical imaging data to a server (e.g., server 420) for distribution to one or more HMDs (e.g., HMDs 402), generating lower resolution representations of the imaging data (e.g., lower resolution mips), downloading the volumetric medical imaging data to one or more HMDs (e.g., HMDs 402), streaming the volumetric medical imaging data and/or lower resolution mips to one or more HMDs (e.g., HMDs 402), etc.

In some embodiments, HMD 402-1, HMD 402-2, server 420, and/or user computing device 430 can interact to provide a collaborative experience in which content being presented is synchronized, but users of different devices can view the content from different angles and/or at different resolutions (e.g., based on the capabilities of the device being used to render the content and/or a network connection being used to access the content).

Additionally, in some embodiments, system 400 can include one or more user input devices 404, which can communicate with an HMD (e.g., HMD 402-2) via a communications link 406. In some embodiments, communications link 406 can be any suitable communications link that can facilitate communication between user input device(s) 404 and HMD 402-2. For example, communications link 406 can be a wired link (e.g., a USB link, an Ethernet link, a proprietary wired communication link, etc.) and/or a wireless link (e.g., a Bluetooth link, a Wi-Fi link, etc.). In some embodiments, user input device(s) 404 can include any suitable sensors for determining a position of user input device 404 with respect to one or more other devices and/or objects (e.g., HMD 402-2, a particular body part of a wearer of HMD 402-2, etc.), and/or a relative change in position (e.g., based on sensor outputs indicating that a user input device 404 has been accelerated in a particular direction, that a user input device 404 has been rotated in a certain direction, etc.). For example, in some embodiments, user input device 404 can include one or more accelerometers, one or more gyroscopes, one or more electronic compasses, one or more image sensors, an inertial measurement unit, etc.

In some embodiments, user input device(s) 404 can be used as a pointing device by the wearer of HMD 402-2 to highlight a particular portion of content (e.g., to segment a portion of object 102) being presented by HMD 402-2, to select a particular portion of object 302, to control one or more user interfaces resented by HMD 402-2, etc. In some embodiments, a second HMD 402-1 that is presenting the same content in a collaborative environment (e.g., an HMD worn by a colleague of the user, a patient of the user, etc.) can present representations of user input device(s) 404 (e.g., to provide context to actions being performed by a user of HMD 402-2). In some embodiments, users in a collaborative environment can be represented avatars at a position in the virtual environment corresponding to that user's viewport. Additionally, in some embodiments, representations of user input devices, clip objects, surgical instruments, etc., associated with the other user can be also be presented within the virtual environment.

In some embodiments, HMD 402-2 and/or server 420 can receive data from user input device(s) 404 indicating movement and/or position data of user input device(s) 404. Based on the data from user input device(s) 404, HMD 402-2 and/or server 420 can determine one or more changes to the content being presented (e.g., a change in orientation and/or position of object 102, a change in orientation and/or position of a clip object 202, a location of a contouring brush, one or more voxels that have been segmented using the contouring brush, etc.). In some embodiments, user input device(s) 404 can be implemented using any suitable hardware. For example, user input device(s) 404 can include one or more controllers that are configured to receive input via one or more hardware buttons, one or more touchpads, one or more touchscreens, one or more software buttons, etc. As another example, user input device(s) 404 can include one or more controllers that are configured to receive input via translation and/or rotation along and around various axes, such as a 6 DOF controller (e.g., a VIVE controller).

In some embodiments, user input device(s) 404 can be an integral part of HMD 402-2, which can, for example, determine a direction in which HMD 402-2 is pointing with respect to a virtual environment and/or virtual object(s). The information on which direction HMD 402-2 is pointing can be used to infer a direction in which the wearer's eyes are looking (which can, for example, be augmented based on gaze information, in some cases). In some embodiments, the inferred location at which the wearer of HMD 402-2 is looking can be used as input to position one or more user interface elements with respect to the virtual environment and/or virtual object, and/or to control an orientation, magnification, and/or position at which to present a virtual object (e.g., as the direction in which a user looks changes, HMD 402-2 can change how content is rendered to allow a user to move around an object as though the object were physically present in front of the user).

In some embodiments, user input device(s) 404 can be a separate device(s) that can convey location information and/or movement information to HMD 402-2 and/or server 420, which can then be used to generate on or more user interface elements (e.g., representations of user input device(s) 404), to facilitate user interaction with the environment being presented via HMD 402-2, and/or virtual object(s) in the virtual environment.

In some embodiments, each HMD 402 can execute an application that can use voxel-based data and/or any other suitable image data to present a 3D model (e.g., a 3D model of a subject based on a medical imaging scan) and/or any other suitable portions of an environment. Additionally, in some embodiments, one or more HMDs 402 can each execute an application that can interact with server 420 (e.g., over communication network 410) to receive voxel-based imaging data to present a content, send and/or receive information about the actions of one or more other users sharing a collaborative environment (e.g., how a user is manipulating one or more objects in the environment) to facilitate a shared experience.

In some embodiments, server 420 can be located locally or remotely from HMDs 402. Additionally, in some embodiments, multiple servers 420 can be used (which may be located in different physical locations) to provide different content, provide redundant functions, etc. In some embodiments, an HMD 402 in system 400 can perform one or more of the operations of server 420 described herein, such as instructing HMDs 402 when another HMD 402 has interacted with the virtual environment, how the HMD 402 interacted with the virtual environment, for distributing updated information, etc.

In some embodiments, a user of any suitable HMD (e.g., HMD 402-2) can control presentation of the content in the virtual environment by providing input to the HMD. For example, one HMD can be designated as having control of the virtual environment and/or one or more objects within the virtual environment, and other HMDs may be locked out from making changes to the virtual environment and/or one or more objects within the virtual environment that are not currently controlled by that HMD.

Figure 5:
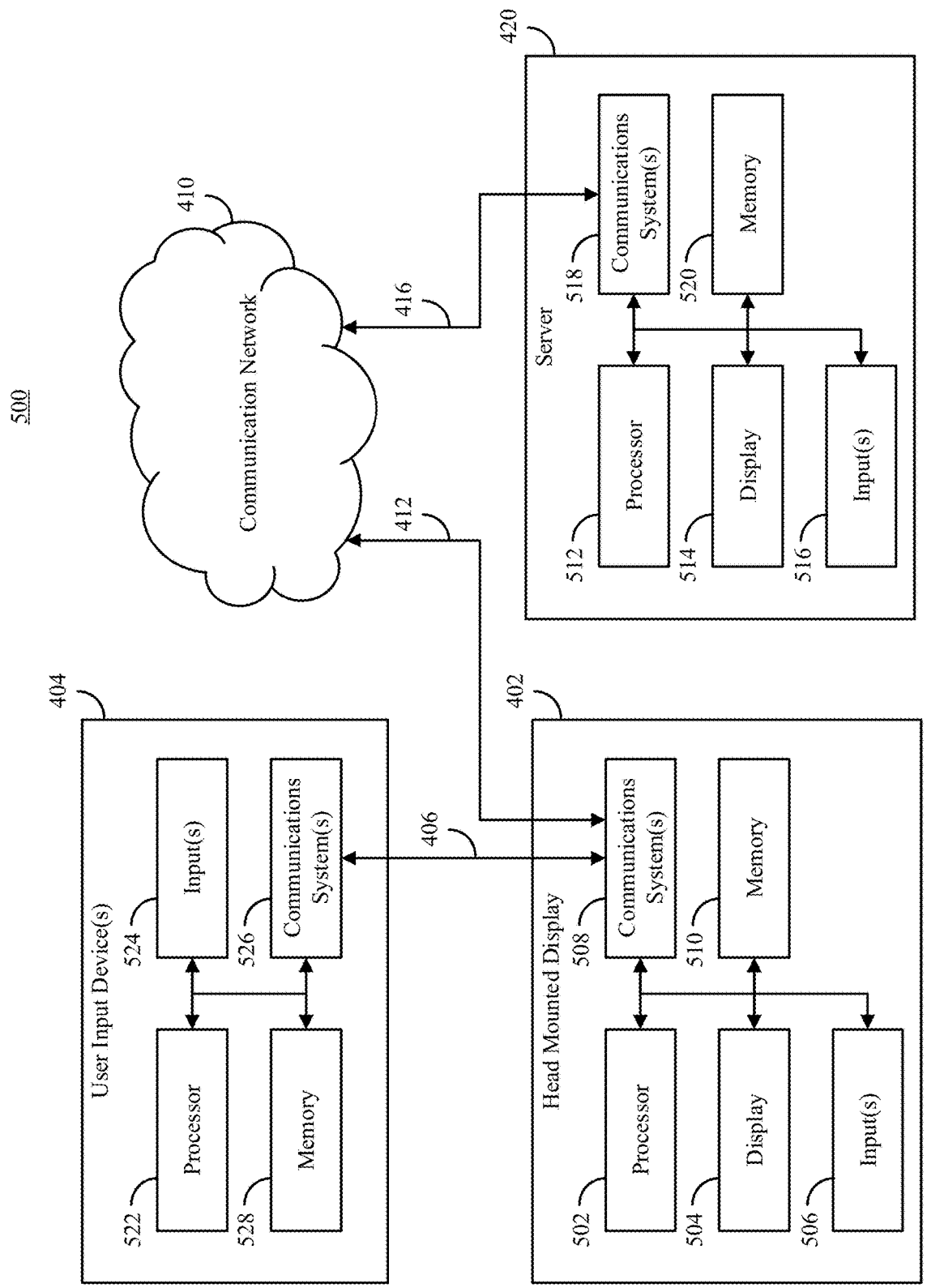
FIG. 5 shows an example of hardware that can be used to implement at least one head mounted display, user input device, and server shown in FIG. 4 in accordance with some embodiments of the disclosed subject matter.

FIG. 5 shows an example 500 of hardware that can be used to implement at least one HMD 402, user input device 404, and server 430 shown in FIG. 4 in accordance with some embodiments of the disclosed subject matter. As shown in FIG. 5, in some embodiments, HMD 402 can include a processor 502, a display 504, one or more inputs 506, one or more communication systems 508, and/or memory 510. In some embodiments, processor 502 can be any suitable hardware processor or combination of processors, such as a central processing unit (CPU), a graphics processing unit (GPU), etc. In some embodiments, display 504 can include any suitable display device(s), such as a stereoscopic display, a transparent display, a semi-transparent display, etc. In some embodiments, inputs 506 can include any suitable input device(s) and/or sensor(s) that can be used to receive user input, such as a 6 DOF user input device, and one or more sensors (e.g., one or more gaze tracking sensors, one or more head tracking sensors, one or more motion sensors, etc.).

In some embodiments, communications systems 508 can include any suitable hardware, firmware, and/or software for communicating information over communication network 410 and/or any other suitable communication networks. For example, communications systems 508 can include one or more transceivers, one or more communication chips and/or chip sets, etc. In a more particular example, communications systems 508 can include hardware, firmware and/or software that can be used to establish a Wi-Fi connection, a Bluetooth connection, a cellular connection, etc.

In some embodiments, memory 510 can include any suitable storage device or devices that can be used to store instructions, values, etc., that can, for example, cause processor 502 to present an environment (e.g., environment 300) using display 504, to communicate with server 420 via communications system(s) 508, etc. Memory 510 can include any suitable volatile memory, non-volatile memory, storage, any other suitable type of storage medium, or any suitable combination thereof. For example, memory 510 can include RAM, ROM, EEPROM, one or more flash drives, one or more hard disks, one or more solid state drives, one or more optical drives, etc. In some embodiments, memory 510 can have encoded thereon a computer program for controlling operation of HMD 402. In some such embodiments, processor 502 can execute at least a portion of the computer program to present content (e.g., one or more 3D models), receive content from server 420, transmit information to server 420, etc. In some embodiments, HMD 402 can use any suitable hardware and/or software for rendering one or more portions of the environment including the 3D model, such as mechanisms described herein for rendering voxel-based 3D content. Additionally, in some embodiments, any suitable communications protocols can be used to communicate control data, imaging data, audio, etc., between HMD 402 and server 420. Note that although the mechanisms described herein are generally described as being used in connection with an HMD, this is merely an example, and the mechanisms can be used in connection with other presentation hardware that can provide an immersive experience, such as a room scale immersive environment.

In some embodiments, server 420 can include a processor 512, a display 514, one or more inputs 516, one or more communication systems 518, and/or memory 520. In some embodiments, processor 512 can be any suitable hardware processor or combination of processors, such as a CPU, a GPU, etc. In some embodiments, display 514 can include any suitable display devices, such as a computer monitor, a touchscreen, a television, a stereoscopic display, etc. In some embodiments, inputs 516 can include any suitable input devices and/or sensors that can be used to receive user input, such as a keyboard, a mouse, a touchscreen, a microphone, etc.

In some embodiments, communications systems 518 can include any suitable hardware, firmware, and/or software for communicating information over communication network 410 and/or any other suitable communication networks. For example, communications systems 518 can include one or more transceivers, one or more communication chips and/or chip sets, etc. In a more particular example, communications systems 518 can include hardware, firmware and/or software that can be used to establish a Wi-Fi connection, a Bluetooth connection, a cellular connection, etc.

In some embodiments, memory 520 can include any suitable storage device or devices that can be used to store instructions, values, etc., that can, for example, cause processor 512 to present content using display 514, to communication with one or more HMDs 402, etc. Memory 520 can include any suitable volatile memory, non-volatile memory, storage, any other suitable type of storage medium, or any suitable combination thereof. For example, memory 520 can include RAM, ROM, EEPROM, one or more flash drives, one or more hard disks, one or more solid state drives, one or more optical drives, etc. In some embodiments, memory 520 can have encoded thereon a server program for controlling operation of server 420. In some such embodiments, processor 512 can execute at least a portion of the computer program to transmit content (e.g., voxel-based 3D content that can be used to render a 3D model) to one or more HMDs 402, receive content from one or more HMDs 402, receive instructions from one or more devices (e.g., HMD 402-2, user input device 404, user computing device 430, another server, a personal computer, a laptop computer, a tablet computer, a smartphone, etc.).

In some embodiments, user input device 404 can include a processor 522, one or more inputs 524, one or more communication systems 526, and/or memory 528. In some embodiments, processor 522 can be any suitable hardware processor or combination of processors, such as a CPU, a GPU, etc. In some embodiments, inputs 524 can include any suitable input devices and/or sensors that can be used to receive user input, such as one or more physical or software buttons, one or movement sensors, a microphone, a touchpad, a touchscreen, etc.

In some embodiments, communications systems 526 can include any suitable hardware, firmware, and/or software for communicating information over communications link 406 and/or any other suitable communications links. For example, communications systems 526 can include one or more transceivers, one or more communication chips and/or chip sets, etc. In a more particular example, communications systems 526 can include hardware, firmware and/or software that can be used to establish a Wi-Fi connection, a Bluetooth connection, a cellular connection, etc.

In some embodiments, memory 528 can include any suitable storage device or devices that can be used to store instructions, values, etc., that can be used, for example, by processor 522 to determine when user input is received, to record sensor data, to communicate sensor data with one or more HMDs 402, etc. Memory 528 can include any suitable volatile memory, non-volatile memory, storage, any other suitable type of storage medium, or any suitable combination thereof. For example, memory 528 can include RAM, ROM, EEPROM, one or more flash drives, one or more hard disks, one or more solid state drives, one or more optical drives, etc. In some embodiments, memory 528 can have encoded thereon a computer program for controlling operation of user input device 404. In such embodiments, processor 522 can execute at least a portion of the computer program to transmit data (e.g., representing sensor outputs) to one or more HMDs 402, to transmit data (e.g., representing sensor outputs) to one or more servers 420, etc.

Figure 6:
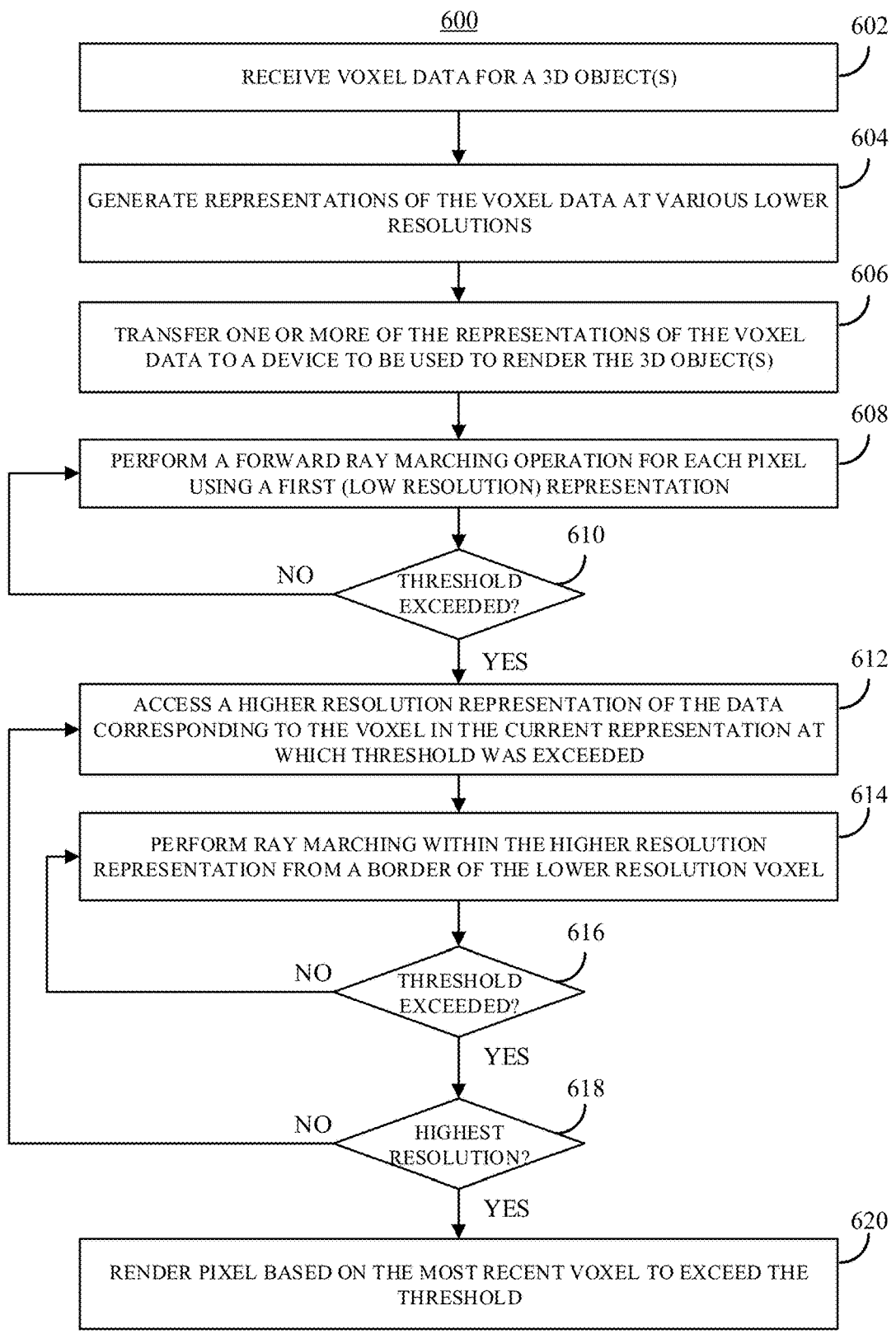
FIG. 6 shows an example of a process for rendering voxel-based 3D content in accordance with some embodiments of the disclosed subject matter.

FIG. 6 shows an example 600 of a process for rendering voxel-based 3D content in accordance with some embodiments of the disclosed subject matter. As shown in FIG. 6, process 600 can begin at 602 by receiving voxel-based data representing one or more three dimensional objects. For example, the voxel-based data can be based on one or more medical imaging scans (e.g., one or more CT scans, one or more MRI scans, one or more ultrasound scans, etc.). As another example, the voxel-based data can be based on data captured using any other suitable 3D imaging device, such as a LiDAR device, a radar device, a sectioning device, etc. In some embodiments, process 600 can receive the voxel-based data from any suitable source, such as an imaging device (e.g., a CT device, an MRI device, an Ultrasound device, a LiDAR device, etc.), a computing device (e.g., user computing device 430, server 420, etc.).

At 604, process 600 can generate one or more representations of the voxel-based data at various lower resolutions. For example, process 600 can generate mips of various lower resolutions based on the received voxel-based data. In such an example, process 600 can group voxels within the voxel-based data based on location, and can generate a value(s) for voxels at the lower resolution (e.g., a voxel representing a larger volume) based on the value(s) of the voxels in each group.

At 606, process 600 can transfer one or more of the representations of the voxel-based data to a device that can be used to render a scene including an object(s) represented by the voxel-based data. For example, process 600 can transfer a file (e.g., a texture file) that includes a set of representations of the voxel-based data (e.g., including the voxel-based data itself) to a device prior to the device attempting to render the voxel-based data. As another example, process 600 can transfer representations of different resolutions as the device is attempting to render the voxel-based data. In such an example, process 600 can separately stream one or more relatively low resolution representations of the voxel-based content, and one or more relatively higher resolution representations of the voxel-based content (e.g., including the voxel-based data itself). In a more particular example, process 600 can first stream a lowest resolution and second lowest resolution representation of the voxel-based data, and upon completing transfer of the lower resolution representations can begin streaming successively higher resolution representations. This can facilitate faster rendering of a version of the voxel-based content while a higher (or highest) resolution version is being transferred to the device, which can in some cases allow the device to begin rendering content more quickly than if all of the various representations were transferred prior to the device attempting to render the content. In some embodiments, mipmaps can be stored and/or transferred in a format that is suitable for loading into a GPU framebuffer or conversion into a format that can be loaded into a framebuffer. In some embodiments, process 600 can populate one or more representations of the voxel-based data in the GPU of the rendering device at a beginning of a rendering process (e.g., prior to 608), and/or can stream one or more representations of the voxel-based data to the GPU memory and/or overwrite the data in the GPU memory as rendering is occurring (e.g., as 608 to 620 as described below occur). In such embodiments, representations can be streamed to facilitate rendering the content more quickly (e.g., by initially presenting a lower resolution version of the content) and/or to facilitate rendering dynamic content that changes over time (e.g., a moving three dimensional model, real-time MRI data, etc.).

At 608, process 600 can perform a forward ray marching operation for one or more pixels that may render a portion of an object(s) represented by the voxel-based data based on a first representation of the voxel-based data. For example, process 600 can perform a first ray marching operation using the lowest available representation of the voxel-based content. In some embodiments, process 600 can determine a step size to use during the ray marching operation based on the size (in voxels) of the representation and/or the volume represented by the voxels. For example, as described above in connection with FIG. 2, process 200 can select a step size for raymarching that is roughly equal to the shortest dimension of the voxel(s) (e.g., 100% of the shortest voxel dimension, 99% of the shortest voxel dimension, 98% of the shortest voxel dimension, etc.).

At 610, process 600 can determine whether a voxel corresponding to the endpoint of a current step exceeds a threshold and/or whether the voxels that have already been traversed by the raymarching operation collectively exceed a threshold. In some embodiments, the threshold can represent an intensity of the image data (e.g., defined by a grayscale value, defined by averaging intensity across multiple imaging channels, etc.), a transparency of the data (e.g., defined by an alpha channel), or any suitable value (e.g., an elasticity value generated by magnetic resonance electrography techniques, a value representing a volume of blood flow, etc.). Additionally, in some embodiments, the threshold can be defined using units used in an underlying imaging modality (e.g., Hounsfield Units). In some embodiments, the threshold can compared to be an accumulated value based on the value contributed by each voxel that has been encountered so far, which is added to a cumulative value that can be compared to a threshold. If process 600 determines that the threshold has not been exceeded ("NO" at 610), process 600 can return to 608, and continue to perform ray marching (e.g., by advancing the ray a step). Otherwise, if process 600 determines that the threshold has been exceeded ("YES" at 610), process 600 can move to 612.

Note that although process 600 (and mechanisms described herein) are generally described in connection with exceeding a particular threshold, this is merely an example, and the threshold can be applied to any suitable Boolean condition that can be stored in the color channels (RGB) and/or alpha/transparency channel (a) of the texture. For example, for CT imaging data, the RGB channels can be used to store a color map, and the a channel can be used to store Hounsfield units for the CT. In such an example, the threshold can operate on the a channel, and can be based on whether a particular value is exceeded (e.g., if the rendering process is intended to render bone), whether a particular value has not been exceeded (e.g., if the rendering process is intended to render bone soft tissue), or is within a particular range (e.g., if the rendering process is intended to render tissue that generally takes values having a particular range of Hounsfield units). Additionally, in some embodiments, the threshold can be a combination of conditions, such as whether the value on the RGB channels has a mean value above a particular threshold value, while the value on the a channel has a mean value below a second threshold value. In some embodiments, the threshold can simply be whether any data exists at all (e.g., whether any non-zero value is present in any of the channels), which can be used to skip blank spaces, while recording voxels and/or daughter voxels traversed by a ray. Such information can be used to determine an order in which the voxels are traversed, which can be used in other rendering operations.

In general, although a texture map may generally referred to as having RGBα channels, this is merely a nomenclature used to reflect the conventional use of texture maps and/or frame buffers to render conventional graphical images. In some embodiments, any suitable information can be provided in the memory provided for these channels. For example, for 8 bit color, an RGBα-based texture can be used to store 32 bits of arbitrary information at each voxel that can be logically combined by grouping into mip levels.

As described above, in some embodiments, the threshold can compared to be an accumulated value based on the value contributed by each voxel that has been encountered so far, which is added to a cumulative value that can be compared to a threshold. For example, if the threshold is based on transparency, the transparency value (e.g., the value on the A channel) of each voxel can be added to a cumulative value, and process 600 can accumulate a value at each voxel that is encountered, and determine when to terminate a ray marching operation when the threshold is exceeded by the cumulative value. In such embodiments, a different threshold can be applied at different points in process 600. For example, the threshold at 610 can be an individual threshold to determine if the voxel that has been encountered may contribute to the cumulative threshold, and the threshold described below in connection with 616 can be the cumulative threshold to determine whether the cumulative threshold has been reached, which can result in process 600 being terminated with rendering of the pixel.

In some embodiments, process 600 can perform a forward ray marching operation for each pixel to be rendered (e.g., at a display resolution) at 608 regardless of the resolution of the representation being used and/or whether multiple pixels would traverse the same voxel.

Alternatively, in some embodiments, process 600 can perform a forward ray marching operation for groups of pixel that correspond to a single voxel based on the particular representation that is being used and/or can perform a forward ray marching operation for groups of pixels based on the resolution of the particular representation that is being used. For example, in some embodiments, for a representation that is half the resolution of a highest resolution representation, pixels can be grouped into groups of four neighboring pixels (e.g., 2×2 pixels), and a single ray can be used for each group. As another example, based on a distance to a front of a bounding box of an object being rendered, and a resolution of the representation, process 600 can determine that neighboring pixels are likely to intersect the same voxel of the representation and can use a single ray to represent a group of pixels (note that a single pixel can potentially be represented by multiple rays). In a particular example, for a representation that is $16^3$ voxels, if the object is to be rendered using several hundred pixels, there is a high likelihood that if individual rays are used for each pixel the rays will all intersect the same voxel. In such an example, pixels can be grouped (and the groups can overlap in some embodiments), such that a single ray can be used to determine when the group of pixels intersects a voxel that exceeds a threshold. As described below in connection with 612, process 600 can access a higher resolution representation of the data corresponding to the voxel in which a threshold was exceeded. In some embodiments in which a single ray is used to represent a group, as the resolution of the representation is increased, the number of pixels in each group can be decreased and rays can be recursively added to provide higher resolution information related to which daughter voxel is likely to be traversed for a ray originating at each pixel. Note that in some embodiments, for pixels that are included in overlapping groups this can result in multiple ray marching operations being performed for a particular pixel for a particular representation. However, eventually one of the rays will be revealed as corresponding to a "true" ray for that pixel, and values generated from other rays for that pixel can be discarded.

In some embodiments, if process 600 determines that a group of pixels can be represented by a single ray (e.g., because a ray emitted from each pixel would be incident on the same voxel), process 600 can group the pixels as a single vertex, and a fragment shader can be used to render differences in appearance caused by lighting effects, shadowing, etc.).

At 612, process 600 can access a higher resolution representation of at least the voxel or voxels that caused the threshold to be exceeded. For example, as described above in connection with FIG. 2, process 600 can access the "daughter" voxels in a next highest resolution representation of the voxel-based data.

At 614, process 600 can perform a forward ray marching operation for one or more pixels that may render a portion of an object(s) represented by the voxel-based data based on the higher resolution representation of the voxel-based data. For example, process 600 can perform a ray marching operation using the current representation of the voxel-based content. In some embodiments, process 600 can determine a step size to use during the ray marching operation based on the size (in voxels) of the representation and/or the volume represented by the voxels in the current representation of the voxel-based data. For example, as described above in connection with FIG. 2, process 600 can select a step size for raymarching that is roughly equal to the shortest dimension of the voxel(s) (e.g., 100% of the shortest voxel dimension, 99% of the shortest voxel dimension, 98% of the shortest voxel dimension, etc.).

Note that, in some embodiments, raymarching at higher resolution representations can be performed without an explicit step size. For example, rather than performing ray marching beginning at a border of the lower resolution voxel, process 600 can determine an order in which the daughter voxels would be traversed based on the initial direction of the ray in comparison to the lower resolution voxel, and can compare the value of each daughter voxel to the threshold based on the order.

At 616, process 600 can determine can determine whether a voxel corresponding to the endpoint of a current step exceeds a threshold and/or whether the voxels that have already been traversed by the raymarching operation collectively exceed a threshold. If process 600 determines that the threshold has not been exceeded ("NO" at 616), process 600 can return to 614, and continue to perform ray marching (e.g., by advancing the ray a step) within the current representation of the voxel-based content. Otherwise, if process 600 determines that the threshold has been exceeded ("YES" at 616), process 600 can move to 618.

As described above in connection with 610, in some embodiments, the threshold at 616 can be different than the threshold at 610. For example, the threshold at 610 can be a threshold applied to skip empty voxels (e.g., voxels with no data), or voxels for which the RGB channel or the A channel meets a particular criteria (e.g., corresponding to a particular type of tissue), while the threshold at 616 can be a threshold used to determine where to render a surface and/or a cumulative threshold used to determine when the voxels that have been traversed have collectively met a particular threshold (e.g., a transparency threshold).

At 618, process 600 can determine whether the current representation of the voxel-based content is a highest resolution representation of the voxel-based content that is available. For example, process 600 can determine whether a higher resolution representation of the content is available within a file that includes all available representations of the voxel-based content. As another example, process 600 can access a value indicating whether a current representation of the voxel-based content is a highest resolution representation of the content and/or was a highest resolution representation of the content at the time that the rendering of the current frame was initiated. If process 600 determines that the current representation is not the highest resolution representation available ("NO" at 618), process 600 can return to 612 to access a next highest resolution representation of the data. Otherwise, if process 600 determines that the current representation is the highest resolution representation available ("YES" at 618), process 600 can move to 620, and can render a pixel based on the most recent voxel that exceeded the threshold at 616. Note that, in some embodiments, process 600 can render a pixel based on a relatively low resolution representation of the content while ray marching is being performed at higher resolution versions of the content. For example, process 600 can render the pixel at 620 prior to the determination at 618 of whether the current representation is the highest resolution representation available.

In some embodiments, process 600 can return to 608 to continue a forward ray marching operation regardless of whether the highest resolution representation has been traversed for a particular voxel. For example, if process 600 is being used to map an order in which voxels near a surface of an object are traversed for use in various rendering processes (e.g., surface rendering, rendering reflections, rendering shadows, etc.), process 600 can return to 608 responsive to process 600 determining that the current representation is the highest resolution representation available ("YES" at 618).

Additionally or alternatively, in some embodiments, if the threshold applied at 616 is a cumulative threshold and/or if the last daughter voxel is reached corresponding to the lower resolution representation, process 600 can return to 608 and/or can proceed to a daughter voxel corresponding to a neighboring parent voxel. In some embodiments, in the case of a cumulative threshold, when the threshold is exceeded at a particular lower resolution representation, a ray marching operation at a higher resolution representation can be recursively performed at the higher resolution representation (e.g., by determining which daughter voxels at the higher resolution would be traversed and accumulating the values from those daughter cells) to verify whether the threshold is satisfied at the higher resolution.

Additionally or alternatively, in some embodiments, in the case of reaching the last daughter voxel without satisfying the threshold, process 600 can return to 608 to continue performing ray marching. For example, the daughter voxels traversed by the ray may have been empty (or simply not satisfied the threshold) whereas the another daughter cell(s) used to generate the value used in the lower resolution representation would have caused the threshold to be satisfied if the ray had traversed that daughter cell. In a more particular example, if in FIG. 2, the bottom-left and top-left voxels were both empty in second representation 204, process 600 can return to 608 to continue ray marching within first representation 202 or continue ray marching through second representation 204 until a voxel satisfying the threshold is encountered.

Note that, in some embodiments, process 600 can be carried out in parallel for each pixel to be rendered and/or for a subset of pixels to be rendered (e.g., for even lines, then for odd lines).

Figure 7:
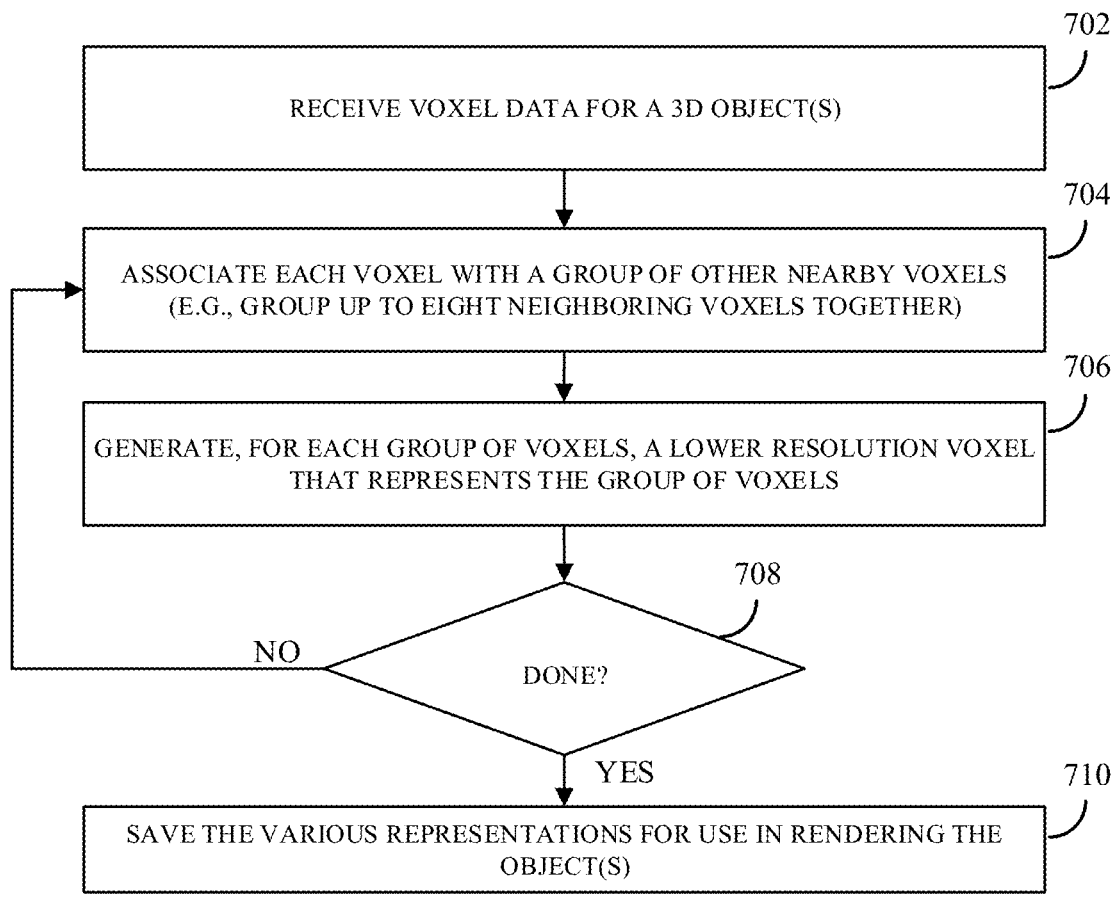
FIG. 7 shows an example of a process for generating multi-resolution voxel-based 3D content that can be used to render voxel-based 3D content in accordance with some embodiments of the disclosed subject matter.

FIG. 7 shows an example 700 of a process for generating multi-resolution voxel-based 3D content that can be used to render voxel-based 3D content in accordance with some embodiments of the disclosed subject matter. As shown in FIG. 7, process 700 can begin at 702 by receiving voxel data for one or more 3D objects. In some embodiments, the content can be received from any suitable source, such as an imaging device, a user computing device, a server, etc.

At 704, process 700 can associate each voxel in the voxel data received at 702 with group of neighboring voxels. In some embodiments, process 700 can associate any suitable number of voxels into a group of voxels. For example, in some embodiments, process 700 can associate eight neighboring voxels into a group of voxels (e.g., a 2×2×2 block of voxels). In some examples, process 700 can pad the voxel data with blank voxels to generate data that can be divided evenly into groups of pixels. Alternatively, in some embodiments, process 700 can generate one or more groups that are shorter along one or more dimensions (e.g., by creating one or more blocks that are 1×2×2, 2×1×2, etc., for data that has an odd number of voxels). Note that there may be voxels in the voxel data that are not associated with any object (e.g., such voxels may be associated with empty space). Such voxels may be associated with data (e.g., the voxel can be associated with data indicating that the voxel is clear, with RGBα vales of [0,0,0,0]) or not associated with any data. In some embodiments, such voxels can still be included in groups of voxels at 704.

At 706, process 700 can generate, for each group of voxels, a lower resolution voxel (i.e., a voxel representing a larger volume) that can be used in a lower resolution representation of the voxel data. In some embodiments, process 700 can assign any suitable value to the lower resolution voxel, which can depend on a desired rendering appearance and/or a threshold to be used in a ray marching operation. For example, in some embodiments, process 700 can determine which of the voxels in the group of voxels has a maximum value (e.g., a maximum brightness value, a maximum alpha value, a maximum Hounsfield value, a maximum density value, etc.), and can assign the maximum value to the lower resolution voxel. As another example, in some embodiments, process 700 can determine which of the voxels in the group of voxels has a minimum value (e.g., a minimum brightness value, a minimum alpha value, a minimum Hounsfield value, a minimum density value, etc.), and can assign the minimum value to the lower resolution voxel. As still another example, in some embodiments, process 700 can determine an average of some value of the voxels in the group of voxels (e.g., for determining an average brightness value, an average alpha value, an average Hounsfield value, an average density value, etc.), and can assign the average value to the lower resolution voxel. Note that in some embodiments, empty voxels can be excluded from the average calculation.

At 708, process 700 can determine if the generation of lower resolution representations of the voxel data is complete. For example, process 700 can continue generating successively lower resolution representations of the voxel data until a representation at a particular resolution is generated (e.g., a representation with a dimension that is below a threshold number of voxels). As another example, process 700 can continue generating successively lower resolution representations of the voxel data until the voxel size exceeds a threshold (e.g., when at least one dimension of the volume represented by a voxel in the representation exceeds a threshold). As yet another example, process 700 can continue generating successively lower resolution representations of the voxel data until a predetermined number of lower resolution representations of the voxel data have been generated. As still another example, process 700 can continue generating successively lower resolution representations of the voxel data until at least one of the preceding stopping criteria have been satisfied (e.g., until a predetermined number of representations have been generated or the resolution of the most recently generated version is at or below a threshold resolution). If process 700 determines that at least one additional lower resolution representation of the voxel data is to be generated ("YES" at 708), process 700 can return to 704, and can associate voxels of a lower resolution representation of the voxel data with a group of other voxels of the lower resolution representation of the voxel data. For example, voxels from a representation that was generated at 704 based on the voxel data received at 702 can be grouped with other nearby voxels.

Alternatively, in some embodiments, at 704, process 700 can group the voxels of the voxel data received at 702 into multiple groups of different size. For example, process 700 can group eight neighboring voxels to be used in generating a first lower resolution representation of the voxel data, can group 32 neighboring voxels to be used in generating a second lower resolution representation of the voxel data, can group 128 neighboring voxels to be used in generating a third lower resolution representation of the voxel data, and so on.

Otherwise, if process 700 determines that no additional lower resolution representations of the voxel data are to be generated ("NO" at 708), process 700 can move to 710. At 710, process 700 can save the various representations of the voxel data to be used in rendering the object or objects represented by the voxel data. In some embodiments, the various representations can be stored in one or more files using any suitable file formats. For example, the various representations can be saved as a 3D texture file. In such an example, the 3D texture file can be used as a mipmap that is supported by many GPU implementations. In another example, the various representations can be saved as sequential buffers with known sizes and indexes for cutoffs between values, and a process used to render content (e.g. process 600) can load the sequential buffers to memory for use and/or modification at rendertime.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any other suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIGS. 6 and 7 can be executed or performed in any order or sequence not limited to the order and sequence shown and described in the figures. Also, some of the above steps of the processes of FIGS. 6 and 7 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

The invention claimed is:

1. A system for rendering voxel-based content, comprising:
   at least one display comprising a plurality of pixels; and
   at least one hardware processor that is programmed to:
      receive voxel-based data representing one or more objects depicted in the voxel-based content, the voxel-based data including representations of the one or more objects at multiple different resolutions;
      perform, for a first pixel of the plurality of pixels and a first representation of the voxel-based content that includes a first plurality of voxels that each represent a first volume, a first forward-projection ray marching operation with a first step size based on the first volume of the first plurality of voxels;
      identify, based on the first forward projection ray marching operation, a first voxel included in the first representation that causes a criterion to be satisfied;
      perform, for the first pixel of the plurality of pixels and a second representation of the voxel-based content that includes a second plurality of voxels that each represent a second volume that is smaller than the first volume, a second forward-projection ray marching operation, wherein the second plurality of voxels each represents a portion of the voxel-based data that is also represented by the first voxel;
      identify, based on the second forward projection ray marching operation, a second voxel included in the second representation that causes the criterion to be satisfied;

determine that the second representation is a highest resolution representation available; and cause the first pixel to present a portion of the one or more objects based on a value associated with the second voxel.

2. The system of claim 1, the system comprising a head mounted display (HMD) incorporating the at least one display and the at least one hardware processor.

3. The system of claim 1, the system comprising a mobile computing device incorporating the at least one display and the at least one hardware processor.

4. The system of claim 1, wherein a highest resolution representation of the voxel-based content included in the voxel-based data has a shortest dimension of at least 256 voxels.

5. The system of claim 1, wherein the number of voxels represented by a highest resolution representation of the voxel-based content included in the voxel-based data is at least 500 times the number of voxels represented by the first representation of the voxel data.

6. The system of claim 5, wherein the second representation of the voxel-based content is the highest resolution representation received voxel-based data, and wherein the processor is further programmed to:
perform, for the first pixel of the plurality of pixels and a third representation of the voxel-based content that includes a third plurality of voxels that each represent a third volume that is smaller than the first volume and larger than the second volume, a third forward-projection ray marching operation with a third step size based on the third volume of the third plurality of voxels, wherein the third plurality of voxels each represents a portion of the voxel-based data that is also represented by the first voxel and the second plurality of voxels each represents a portion of the voxel-based data that is also represented by the third voxel;

identify, based on the third forward projection ray marching operation, a third voxel included in the third representation that causes the criterion to be satisfied; and begin the second forward-projection ray marching operation at a voxel of the third plurality of voxels that corresponds to a portion of the first voxel at which the first forward-projection ray marching operation intersected the first voxel.

7. The system of claim 1, wherein the first forward-projection ray marching operation with the first step size includes:

(i) advancing a ray one step through the first representation of the voxel-based content by an incremental distance corresponding to the first step size;

(iii) determining whether a voxel corresponding to an endpoint of the step causes the criterion to be satisfied; and (iii) repeating (i) and (ii) until the criterion is satisfied.

8. A method for rendering voxel-based content, comprising:

receiving voxel-based data representing one or more objects depicted in the voxel-based content, the voxel-based data including representations of the one or more objects at multiple different resolutions;

performing, for a first pixel of a plurality of pixels and a first representation of the voxel-based content that includes a first plurality of voxels that each represent a first volume, a first forward-projection ray marching operation with a first step size based on the first volume of the first plurality of voxels;

identifying, based on the first forward projection ray marching operation, a first voxel included in the first representation that causes a criterion to be satisfied;

performing, for the first pixel of the plurality of pixels and a second representation of the voxel-based content that includes a second plurality of voxels that each represent a second volume that is smaller than the first volume, a second forward-projection ray marching operation, wherein the second plurality of voxels each represents a portion of the voxel-based data that is also represented by the first voxel;

identifying, based on the second forward projection ray marching operation, a second voxel included in the second representation that causes the criterion to be satisfied;

determining that the second representation is a highest resolution representation available; and causing the first pixel to present a portion of the one or more objects based on a value associated with the second voxel.

9. The method of claim 8, wherein the plurality of pixels are pixels of a display associated with a head mounted display (HMD).

10. The method of claim 8, wherein the plurality of pixels are pixels of a display associated with a mobile computing device.

11. The method of claim 8, wherein a highest resolution representation of the voxel-based content included in the voxel-based data has a shortest dimension of at least 256 voxels.

12. The method of claim 8, wherein the number of voxels represented by a highest resolution representation of the voxel-based content included in the voxel-based data is at least 500 times the number of voxels represented by the first representation of the voxel data.

13. The method of claim 12, wherein the second representation of the voxel-based content is the highest resolution representation received voxel-based data, wherein the method further comprises:
performing, for the first pixel of the plurality of pixels and a third representation of the voxel-based content that includes a third plurality of voxels that each represent a third volume that is smaller than the first volume and larger than the second volume, a third forward-projection ray marching operation with a third step size based on the third volume of the third plurality of voxels, wherein the third plurality of voxels each represents a portion of the voxel-based data that is also represented by the first voxel and the second plurality of voxels each represents a portion of the voxel-based data that is also represented by the third voxel;

identifying, based on the third forward projection ray marching operation, a third voxel included in the third representation that causes the criterion to be satisfied; and beginning the second forward-projection ray marching operation at a voxel of the third plurality of voxels that corresponds to a portion of the first voxel at which the first forward-projection ray marching operation intersected the first voxel.

14. The method of claim 8, wherein the first forward-projection ray marching operation with the first step size includes:
(i) advancing a ray one step through the first representation of the voxel-based content by an incremental distance corresponding to the first step size;
(iii) determining whether a voxel corresponding to an endpoint of the step causes the criterion to be satisfied; and
(iii) repeating (i) and (ii) until the criterion is satisfied.

15. A non-transitory computer readable medium containing computer executable instructions that, when executed by a processor, cause the processor to perform a method for rendering voxel-based content, the method comprising:
receiving voxel-based data representing one or more objects depicted in the voxel-based content, the voxel-based data including representations of the one or more objects at multiple different resolutions;
performing, for a first pixel of a plurality of pixels and a first representation of the voxel-based content that includes a first plurality of voxels that each represent a first volume, a first forward-projection ray marching operation with a first step size based on the first volume of the first plurality of voxels;
identifying, based on the first forward projection ray marching operation, a first voxel included in the first representation that causes a criterion to be satisfied;
performing, for the first pixel of the plurality of pixels and a second representation of the voxel-based content that includes a second plurality of voxels that each represent a second volume that is smaller than the first volume, a second forward-projection ray marching operation, wherein the second plurality of voxels each represents a portion of the voxel-based data that is also represented by the first voxel;
identifying, based on the second forward projection ray marching operation, a second voxel included in the second representation that causes the criterion to be satisfied;
determining that the second representation is a highest resolution representation available; and
causing the first pixel to present a portion of the one or more objects based on a value associated with the second voxel.

16. The non-transitory computer readable medium of claim 15, wherein the plurality of pixels are pixels of a display associated with a head mounted display (HMD).

17. The non-transitory computer readable medium of claim 15, wherein the plurality of pixels are pixels of a display associated with a mobile computing device.

18. The non-transitory computer readable medium of claim 15, wherein a highest resolution representation of the voxel-based content included in the voxel-based data has a shortest dimension of at least 256 voxels.

19. The non-transitory computer readable medium of claim 15, wherein the number of voxels represented by a highest resolution representation of the voxel-based content included in the voxel-based data is at least 500 times the number of voxels represented by the first representation of the voxel data.

20. The non-transitory computer readable medium of claim 19, wherein the second representation of the voxel-based content is the highest resolution representation received voxel-based data, and
wherein the method further comprises:
performing, for the first pixel of the plurality of pixels and a third representation of the voxel-based content that includes a third plurality of voxels that each represent a third volume that is smaller than the first volume and larger than the second volume, a third forward-projection ray marching operation with a step size based on the third volume of the third plurality of voxels, wherein the third plurality of voxels each represents a portion of the voxel-based data that is also represented by the first voxel and the second plurality of voxels each represents a portion of the voxel-based data that is also represented by the third voxel;
identifying, based on the third forward projection ray marching operation, a third voxel included in the third representation that causes the criterion to be satisfied; and
beginning the second forward-projection ray marching operation at a voxel of the third plurality of voxels that corresponds to a portion of the first voxel at which the first forward-projection ray marching operation intersected the first voxel.

21. The non-transitory computer readable medium of claim 15, wherein the first forward-projection ray marching operation with the first step size includes:
(i) advancing a ray one step through the first representation of the voxel-based content by an incremental distance corresponding to the first step size;
(iii) determining whether a voxel corresponding to an endpoint of the step causes the criterion to be satisfied; and
(iii) repeating (i) and (ii) until the criterion is satisfied.

* * * * *